Patented June 4, 1940

2,202,827

UNITED STATES PATENT OFFICE 2,202,827

PROCESS OF PREPARING CYANINE DYES FROM SUBSTITUTED MERCAPTO DERIVATIVES

Leslie G. S. Brooker, Rochester, N. Y., assignor, by mesne assignments, to Eastman Kodak Company, Rochester, N. Y., a corporation of New Jersey No Drawing. Application October 25, 1934, Serial No. 749,926

7 Claims. (Cl. 260—240)

This invention relates to a new process for the preparation of cyanine dyes, and in particular to a process wherein an alkyl quaternary substituted-mercaptocyclammonium salt is condensed with an alkyl quaternary cyclammonium salt containing a reactive methyl group adjacent to the nitrogen atom. This application is a continuation-in-part of the copending application in the name of Grafton H. Keyes and myself Serial No. 739,127, filed August 9, 1934, which describes the preparation of alkyl quaternary substituted-mercaptocyclammonium salts.

It is well known that cyanine dyes of the ψ-cyanine class, preferably known as the 2'-cyanine class, may be prepared by condensing an alkyl quaternary salt of a 2-iodopyridine or a 2-iodoquinoline with an alkyl quaternary cyclammonium salt containing a reactive methyl group adjacent to the quinquivalent nitrogen atom. Many examples of such a reaction are given in my copending application Serial No. 651,870, filed January 16, 1933. Now I have found that a similar condensation can be effected between an alkyl quaternary salt of a 2-(substituted-mercapto)-pyridine or a 2-(substituted-mercapta)-quinoline and an alkyl quaternary cyclammonium salt containing a reactive methyl group. I have further found that the substituted-mercapto derivatives give rise to yields comparable with those obtained by using the iododerivatives and in certain cases give rise to even higher yields. Thus a substituted-mercapto derivative will condense with an alkyl quaternary cyclammonium salt containing a reactive methyl group in the presence of pyridine, whereas an iododerivative will not undergo a similar condensation in the presence of pyridine. See my copending application, Serial No. 652,030, filed January 16, 1933.

An object, therefore, of the present invention is to provide a process for the preparation of 2'-cyanine dyes. A further object is to effect such a preparation by making use of alkyl quaternary salts of 2-(substituted-mercapto)-pyridines and/or 2 - (substituted - mercapto) - quinolines. Other objects will appear hereinafter.

The alkyl quaternary salts of the substituted-mercapto-derivatives, used herein, have the following structural formula:

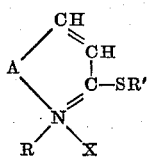

wherein R represents an alkyl group such as methyl, ethyl or n-butyl, R' represents an alkyl group such as methyl, ethyl or n-butyl or an aryl group such as phenyl, p-tolyl, p-chlorophenyl, 2,5-dichlorophenyl, β-naphthyl or a heterocyclic group such as benzothiazolyl or pyrazolonyl, A represents a vinylene, a phenylene or an alkyl-substituted phenylene group and X represents an acid radical such as halide, p-toluenesulfonate or any other suitable anion.

The alkyl quaternary cyclammonium salts containing a reactive methyl group, which are used to condense with the substituted-mercapto derivatives indicated above, have the following structural formula:

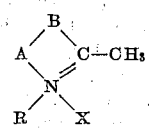

wherein R represents an alkyl group such as methyl, ethyl or n-butyl, X represents an acid radical, such as halide, p-toluene-sulfonate, or any other suitable anion, B represents oxygen, sulfur, selenium, a vinylene group or a dimethylmethylene group, A represents an ethylene group where B represents sulfur, A represents a vinylene or an alkyl- or aryl-substituted vinylene group where B represents oxygen, sulfur, or selenium, A represents a phenylene, or a naphthylene group where B represents oxygen, sulfur, selenium or a vinylene group and A represents a phenylene group where B represents a dimethylmethylene group.

A typical reaction of my invention is illustrated by the following equation:

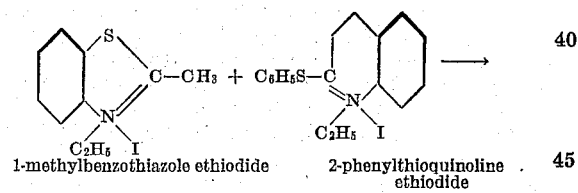

1-methylbenzothiazole ethiodide    2-phenylthioquinoline ethiodide

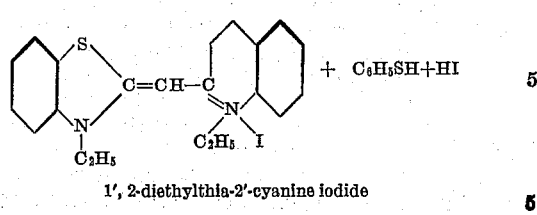

1', 2-diethylthia-2'-cyanine iodide

In addition to the alkyl quaternary cyclammonium salts containing a reactive methyl group in the position adjacent to the nitrogen atom, alkyl quaternary salts of lepidine or its derivatives can be used to condense with the substituted-mercapto derivatives. In such a condensation, a 2,4'-cyanine (isocyanine) dye is obtained. Such a reaction is illustrated by the following equation:

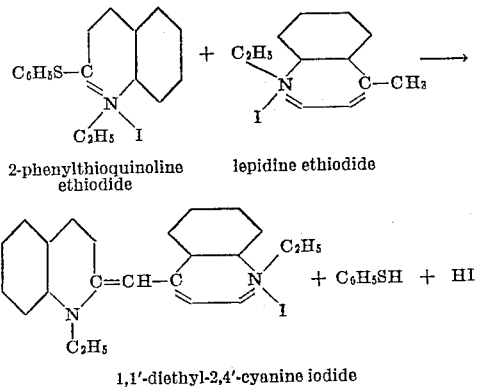

The condensations can be effected in any basic medium which does not adversely affect the reaction and which functions to bind the elements of acid eliminated from the condensing molecules. Triethylamine or pyridine is frequently employed. When triethylamine is used, a solvent for the reactants must be employed. A lower aliphatic alcohol, preferably absolute ethyl alcohol, is suitable for such purpose. Pyridine acts as a solvent for the reacting molecules, in addition to absorbing the acid liberated from the condensing molecules.

The condensation can be effected with or without the application of heat. However, heat is usually employed to accelerate the reaction.

Several examples of the preparation of 2'-cyanine dyes will now be presented. These dyes are representative of the many 2'-cyanine dyes which could be prepared by the method herein recited.

EXAMPLE 1.—1',2-diethylthia-2'-cyanine iodide (a) 1.969 (1 mol.) of 2-phenylthioquinoline ethiodide, 1.759 (1 mol.) of 1-methylbenzothiazole etho-p-toluenesulfonate, 20 cc. of absolute ethyl alcohol and 1.0 g. (2 mols.) of triethylamine were heated to boiling under reflux for several minutes. The dye separated out in the hot. It was collected and washed with water and with acetone. It was recrystallized from methyl alcohol. Melting point 283–4° C.

(b) When 0.5 g. (1 mol.) of triethylamine was used, the yield of washed dye was slightly lower.

(c) Instead of heating the mixture, it was allowed to stand at room temperature for several days. After two days (using the amounts given in a) the yield was about 10% short of that obtained in (a), but rose to the higher yield on standing a week.

Alternative methods follow:

0.37 g. (1 mol.) of 2-(n-butylthio)-quinoline ethiodide, 0.35 g. (1 mol.) of 1-methylbenzothiazole etho-p-toluenesulfonate, 10 cc. of absolute ethyl alcohol and 0.2 g. (2 mols.) of triethylamine were heated to boiling under reflux for several minutes. After recrystallization the dye melted at 285–6° C. (Decomposition.)

0.7 g. (1 mol.) of 1-methylbenzothiazole etho-p-toluenesulfonate, 0.7 g. (1 mol.) of 2-(n-propylthio)-quinoline ethiodide, 15 cc. of absolute ethyl alcohol and 0.4 g. (2 mols.) of triethylamine were heated to boiling under reflux for several minutes. After recrystallization from methyl alcohol, the dye melted at 284–5° C. (Decomposition.)

0.5 g. (1 mol.) 1-methylbenzothiazole etho-p-toluenesulfonate, 0.6 g. (1 mol.) of 2-(p-chlorophenylthio)-quinoline ethiodide, 10 cc. of absolute ethyl alcohol and 0.25 g. (2 mols.) of triethylamine were heated to boiling under reflux for several minutes. After recrystallization from methyl alcohol, the dye melted at 285–6° C. (Decomposition.)

0.6 g. (1 mol.) of 2-(2,5-dichlorophenylthio)-quinoline ethiodide, 0.5 g. (1 mol.) 1-methylbenzothiazole etho-p-toluene sulfonate, 10 cc. of absolute ethyl alcohol and 0.25 g. (2 mols.) of triethylamine were heated to boiling for several minutes. After recrystallization from methyl alcohol, the dye melted at 285–6° C. (Decomposition.)

0.45 g. (1 mol.) of 1-methylbenzothiazole etho-p-toluenesulfonate, 0.5 g. (1 mol.) of 2-(p-tolylthio)-quinoline ethiodide, 20 cc. of absolute ethyl alcohol and 0.25 g. (2 mols.) of triethylamine were heated to boiling under reflux for several minutes. After recrystallization from methyl alcohol the dye melted at 285–6° C. (Decomposition.)

1.97 g. (1 mol.) of 2-phenylthioquinoline ethiodide, 1.76 g. (1 mol.) of 1-methylbenzothiazole etho-p-toluenesulfonate and about 12 cc. of pyridine were boiled under reflux for several minutes. The precipitated dye was recrystallized from methyl alcohol and the recrystallized form melted at about 283° C.

EXAMPLE 2.—1',2-diethyloxa-2'-cyanine iodide 1.45 g. (1 mol.) of 1-methylbenzoxazole ethiodide, 1.96 g. (1 mol.) of 2-phenylthioquinoline ethiodide and 10 cc. of pyridine were boiled under reflux for several minutes. After recrystallization from methyl alcohol, the dye melted at 293–4° C. (Decomposition.)

EXAMPLE 3.—1'-ethyl-1, 3,3-trimethylindo-2'-cyanine iodide 0.75 g. (1 mol.) of 2,3,3-trimethylindolenine methiodide, 0.98 g. (1 mol.) of 2-phenylthioquinoline ethiodide and 5 cc. of pyridine were boiled under reflux for several minutes. After recrystallization from methyl alcohol, the dye melted at 204–5° C. (Decomposition.)

EXAMPLE 4.—1,1'-diethyl-2,2'-cyanine iodide 1.7 g. (1 mol.) of quinaldine etho-p-toluenesulfonate, 1.86 g. (1 mol.) of 2-phenylthioquinoline ethiodide and 10 cc. of pyridine were boiled under reflux for several minutes. After recrystallization from methyl alcohol, the dye melted at 265–6° C. (Decomposition.)

EXAMPLE 5.—1',3-diethyl-4-phenylthiazolo-2'-cyanine iodide 0.44 g. (1 mol.) of 2-methyl-4-phenylthiazole and 0.5 g. (1 mol.) of ethyl p-toluenesulfonate were heated in an oil bath at 110–120° C. for a few hours. The crude salt thus formed, 1.0 g. (1 mol.) of 2-phenylthioquinoline ethiodide, 20 cc. of absolute ethyl alcohol and 0.5 g. (2 mols.) of triethylamine were heated to boiling under reflux for several minutes. After recrystallization from methyl alcohol, the dye melted at 253–5° C. (Decomposition.)

EXAMPLE 6.—*1',3-diethylthiazolino-2'-cyanine iodide*

0.25 g. (1 mol.) of 2-methylthiazoline and 0.5 g. (1 mol.) of ethyl p-toluenesulfonate were heated at 100° C. on the steam bath for six hours. The salt thus formed, 1.0 g. (1 mol.) of 2-phenylthioquinoline ethiodide, 20 cc. of absolute ethyl alcohol and 0.5 g. (2 mols.) of triethylamine were heated to boiling under reflux for several minutes. After recrystallization from methyl alcohol the dye melted at 225–6° C. (Decomposition.)

EXAMPLE 7.—*1'-ethyl-2-methyl-3,4-benzothia-2' cyanine iodide*

0.5 g. (1 mol.) of 2-methyl-β-naphthothiazole metho-p-toluenesulfonate, 0.5 g. (1 mol.) of 2-phenylthioquinoline ethiodide, 20 cc. of absolute ethyl alcohol and 0.25 g. (2 mols.) of triethylamine were heated to boiling under reflux for several minutes. After recrystallization from methyl alcohol, the dye melted at 267–8° C. (Decomposition.)

EXAMPLE 8.—*2-ethyl-1'-methylthia-2' cyanine iodide*

0.9 g. (1 mol.) of 1-methylbenzothiazole etho-p-toluenesulfonate, 0.95 g. (1 mol.) of 2-phenylthioquinoline methiodide, 20 cc. of absolute ethyl alcohol and 0.5 g. (2 mols.) of triethylamine were heated to boiling under reflux for 30 minutes. After recrystallization from methyl alcohol, the dye melted at 268–9° C. (Decomposition.)

EXAMPLE 9.—*1,1'-dimethyl-2-pyrido-2'-cyanine iodide*

1.2 g. (1 mol.) of α-picoline methiodide, 1.9 g. (1 mol.) of 2-phenylthioquinoline methiodide, 40 cc. of absolute ethyl alcohol and 1.0 g. (2 mols.) of triethylamine were heated to boiling under reflux for several minutes. After recrystallization from methyl alcohol, the dye melted at 243–4° C. (Decomposition.)

EXAMPLE 10.—*2-ethyl-1'-methylthia-2'-pyridocyanine iodide*

0.95 g. (1 mol.) of 2-(β-naphthylthio)-pyridine methiodide, 0.9 g. (1 mol.) of 1-methylbenzothiazole etho-p-toluene sulfonate 20 cc. of absolute ethyl alcohol and 0.5 g. (2 mols.) of triethylamine were heated to boiling under reflux for several minutes. After recrystallization from methyl alcohol, the dye melted at 277–8° C. (Decomposition.)

EXAMPLE 11.—*1',3-dimethylthiazolino-2'-pyridocyanine iodide*

0.25 g. (1 mol.) of 2-methylthiazoline and 0.5 g. (1 mol.) of metho-p-toluenesulfonate were heated at 100° C. on a steam bath for several minutes. The salt thus formed, 1.0 g. (1 mol.) of 2-(β-naphthylthio)-pyridine methiodide, 10 cc. of absolute ethyl alcohol and 0.5 g. (2 mol.) of triethylamine were heated to boiling under reflux for several minutes. After recrystallization from methyl alcohol, the dye melted at 256–7° C. (Decomposition.)

EXAMPLE 12.—*3-ethyl-1',4-dimethylthiazolo-2'-pyridocyanine iodide*

0.7 g. (1 mol.) of 2,4-dimethylthiazole ethiodide, 0.95 g. (1 mol.) of 2-(β-naphthylthio)-pyridine methiodide, 10 cc. of absolute ethyl alcohol and 0.5 g. (2 mols.) of triethylamine were heated to boiling under reflux for several minutes. After recrystallization from methyl alcohol, the dye melted at 265–6° C. (Decomposition.)

EXAMPLE 13.—*1',2-diethyl-6'-methylthia-2'-cyanine iodide*

0.23 g. (1 mol.) of 1-methylbenzothiazole etho-p-toluene sulfonate, 0.3 g. (1 mol.) of 6-methyl-2-(β-naphthylthio)-quinoline ethiodide, 10 cc. of absolute ethyl alcohol and 0.25 g. of triethylamine were heated to boiling under reflux for several minutes. After recrystallization from methyl alcohol, the dye melted at 281–3° C. (Decomposition.)

In the foregoing examples the yields are generally satisfactory, varying from 30% to 95%.

The process described herein is a very general one. In its broadest statement, any salt of a 2-alkyl (aryl or heterocyclic) thioderivative of a pyridine or quinoline base can be condensed with any alkyl quaternary cyclammonium salt which contains a reactive methyl group. The result of such a condensation is a 2'-cyanine salt when the reactive methyl group is in the position alpha or adjacent to the quinquivalent nitrogen atom, and a 2,4'-cyanine salt when the reactive methyl group is in the position gamma to or opposite the quinquivalent nitrogen.

What I claim as my invention and desire to secure by Letters Patent of the United States is:

1. A process for preparing a cyanine dye comprising condensing, in the presence of a basic condensing agent, a cyclammonium alkyl quaternary salt containing a reactive methyl group with a cyclammonium alkyl quaternary salt of the following general formula:

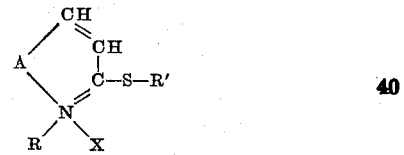

wherein A represents an organic group selected from the group consisting of vinylene and phenylene groups, R represents an alkyl group, R' represents an aryl group selected from the group consisting of aryl groups of the benzene series and aryl groups of the naphthylene series and X represents an acid radical.

2. A process for preparing a cyanine dye comprising condensing, in the presence of a trialkylamine condensing agent, a cyclammonium alkyl quaternary salt containing a reactive methyl group with a cyclammonium alkyl quaternary salt of the following general formula:

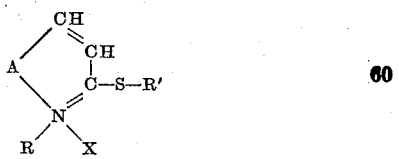

wherein A represents an organic group selected from the group consisting of vinylene and phenylene groups, R represents an alkyl group, R' represents an aryl group selected from the group consisting of aryl groups of the benzene series and aryl groups of the naphthylene series and X represents an acid radical.

3. A process for preparing a cyanine dye comprising condensing, in the presence of a basic condensing agent, a cyclammonium alkyl quaternary salt containing a reactive methyl group with a cyclammonium alkyl quaternary salt of the following general formula:

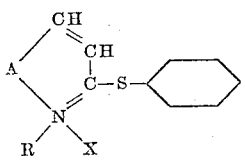

wherein A represents an organic group selected from the group consisting of vinylene and phenylene groups, R represents an alkyl group and X represents an acid radical.

4. A process for preparing a cyanine dye comprising condensing, in the presence of a trialkylamine condensing agent, a cyclammonium alkyl quaternary salt containing a reactive methyl group with a cyclammonium alkyl quaternary salt of the following general formula:

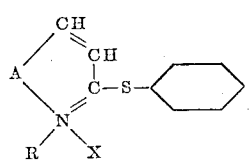

wherein A represents an organic group selected from the group consisting of vinylene and phenylene groups, R represents an alkyl group and X represents an acid radical.

5. A process for preparing a cyanine dye comprising condensing, in the presence of a pyridine condensing agent, a cyclammonium alkyl quaternary salt containing a reactive methyl group with a cyclammonium alkyl quaternary salt of the following general formula:

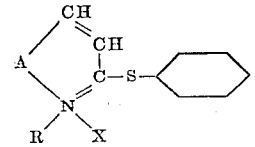

wherein A represents an organic group selected from the group consisting of vinylene and phenylene groups, R represents an alkyl group and X represents an acid radical.

6. A process for preparing a cyanine dye comprising condensing, in the presence of pyridine condensing agent, one molecular proportion of 1-methylbenzothiazole etho - p - toluenesulfonate with one molecular proportion of 2-phenylthioquinoline ethiodide.

7. A process for preparing a cyanine dye comprising condensing, in the presence of triethylamine condensing agent, one molecular proportion of 1-methylbenzoxazole ethiodide with one molecular proportion of 2-phenylthioquinoline ethiodide.

LESLIE G. S. BROOKER.